June 15, 1937.  C. H. RIBBLE ET AL  2,084,109
LOCK WASHER
Filed Oct. 8, 1935
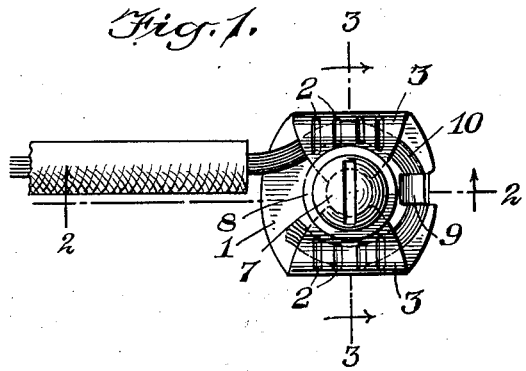
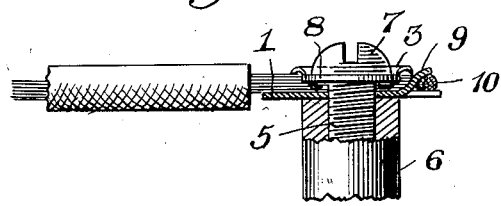
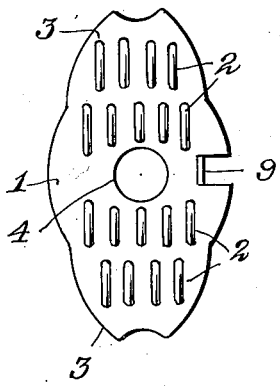
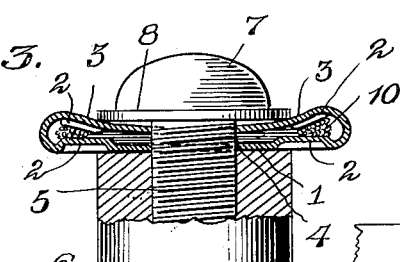
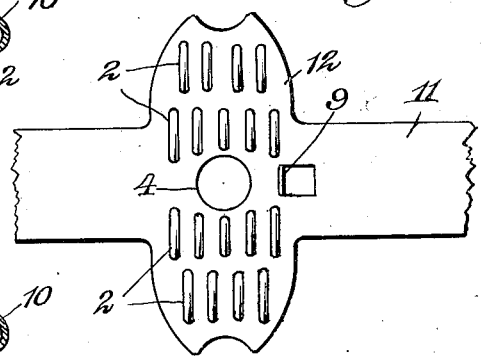
WITNESSES
INVENTORS
Chauncey H. Ribble and
Alexander J. Heidt
BY
ATTORNEYS Patented June 15, 1937

2,084,109

UNITED STATES PATENT OFFICE 2,084,109

LOCK WASHER

Chauncey H. Ribble, Hackensack, N. J., and Alexander J. Heidt, Woodhaven, N. Y.; said Heidt assignor to said Ribble Application October 8, 1935, Serial No. 44,102

2 Claims. (Cl. 173—269)

This invention relates to lock washers, or what may be termed a lock-on washer which is securely clamped on a wire for coupling engagement with a screw or binding post, an object of the invention being to provide such a washer which holds the wire spaced from the screw and which is securely clamped to the wire so that when removed from the screw will remain firmly affixed to the wire for ready coupling engagement whenever desired.

Another object of the invention is to provide a washer which prevents the wire from getting under the screw head and which, of course, may constitute a washer for an electrical connector or for a mechanical anchorage or for holding and coupling any wire or like device with a screw or post.

A further object is to provide a washer of this character which does not depend on the binding action of the screw itself to hold it, but which is self-retained on the wire. By providing a washer of this character many advantages are had, some of which may be enumerated as follows. By keeping the wire away from the screw head, it prevents burning or welding of screw or bolt such as occurs when wires are wrapped directly around the bolt and loosen up, making a poor contact and causing excessive heat or sparking which tends to fuse the bolt and wire together or burn the screw threads.

With the flanged areas of the washer more radiating surface is available around the bolt, and consequently the temperature of the bolt and conductors is kept lower in cases where an excessive amount of current is passing through them. The washer performs the function of a positive terminal and at the same time produces a riveted terminal that always holds the wire in the same position when re-connected.

With these and other objects in view, the invention consists in certain novel features of construction and combinations and arrangements of parts, all of which will be more fully hereinafter described and pointed out in the claims.

In the accompanying drawing:

Fig. 1 is a plan view of our improved washer, showing it in operative position in connection with a screw and post or support therefor;

Fig. 2 is a view in section on the line 2—2 of Fig. 1;

Fig. 3 is a somewhat enlarged view in transverse section on the line 3—3 of Fig. 1;

Fig. 4 is a view in section through the washer and wire with the washer detached from the screw;

Fig. 5 is a plan view of the plate before bending to form the washer; and

Fig. 6 is a plan view illustrating the application of the same principle of washer to a terminal strip.

Our improved washer comprises a plate 1 which is of somewhat elliptical shape and which is provided with a plurality of series of corrugations 2. We have shown four of these series of corrugations and the plate is bent on a line between each of the two outer series and bent downwardly and inwardly constituting clamping tongues 3—3. The plate 1 has a central opening 4 to receive a screw or bolt 5 which is illustrated as screwed into a binding post 6 and provided with a head 7. In the particular illustration we have shown a spacing washer 8 between the head 7 and the free ends of the tongues 3. At one side of the plate 1 a lug 9 is struck upwardly from the plate and is spaced from the opening 4.

It will be noted that the corrugations 2 in adjacent series or sets are out of alignment or in staggered relation to each other, so that when the tongues are bent over, these corrugations will act as gripping teeth to grip a wire 10 secured under the tongues 3 and back of the lug 9. This wire 10 may constitute an electric conductor or it may be any other type of wire, and it will be noted that the wire is positioned under the tongues 3 and back of the lug 9 which function to hold the wire in a somewhat circular formation and spaced from the opening 4 so that the wire is held away from the screw 5. While, of course, the head of the bolt functions to bend downwardly the inner or free ends of the tongues 3 and effectually bind the wire in the washer, yet there is sufficient binding action of the tongues on the wire to maintain the washer on the wire when removed from the screw.

In Fig. 6 a modification is illustrated in which 11 constitutes a terminal strip having an integral plate 12 corresponding with plate 1, and this plate 12 which constitutes an integral portion of the strip 11 is constructed precisely like the plate 1 above described, and like reference characters are employed to indicate like parts.

While we have illustrated corrugations 2, it is of course to be understood that as a substitute therefor any other formation of roughened or irregular surface might be employed to insure a firm gripping action of the washer-plate and tongues upon the wire, and while we illustrate the lug 9 at a particular angle it is of course to be understood that this angle may be varied as desired.

While we have illustrated and described what we believe to be a preferred embodiment of our invention, it is to be distinctly understood that various slight changes may be made with regard to the form and arrangement of parts without departing from our invention, and hence we do not limit ourselves to the precise details set forth but consider ourselves at liberty to make such changes and alterations as fairly fall within the spirit and scope of the claims.

We claim:

1. A device of the character described, including a plate of greater length than width and having a central opening, the ends of said plate at opposite sides of the opening bent upon themselves upon substantially parallel transverse fold lines forming wire-engaging clamps, and a lug struck upwardly from the edge of the plate at a point intermediate the said fold lines for the positioning of the wire back of the same.

2. A device of the character described, including a plate of greater length than width and having a central opening, the ends of said plate at opposite sides of the opening bent upon themselves upon substantially parallel transverse fold lines forming wire-engaging clamps, and a lug struck upwardly from the edge of the plate at a point intermediate the said fold lines for the positioning of the wire back of the same, said plate at opposite sides of the fold lines having rows of serrations, the serrations of adjacent rows having staggered relation to each other.

CHAUNCEY H. RIBBLE.
ALEXANDER J. HEIDT.